US007907586B2

(12) United States Patent
Al-Zain et al.

(10) Patent No.: US 7,907,586 B2
(45) Date of Patent: Mar. 15, 2011

(54) DETERMINING A TRANSMISSION PARAMETER IN A TRANSMISSION SYSTEM

(75) Inventors: Djamal Al-Zain, Berlin (DE); Heinz-Joachim Laake, Oberkrämer (DE); Konrad Lenz, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 920 days.

(21) Appl. No.: 10/887,382

(22) Filed: Jul. 7, 2004

(65) Prior Publication Data

US 2005/0030903 A1 Feb. 10, 2005

(30) Foreign Application Priority Data

Aug. 5, 2003 (EP) .................................. 03017895

(51) Int. Cl.
*H04W 4/00* (2009.01)
(52) U.S. Cl. ...................... 370/342; 370/335; 455/422.1; 455/434
(58) Field of Classification Search .................. 370/335, 370/342; 455/422.1, 434, 454
See application file for complete search history.

(56) References Cited

U.S. PATENT DOCUMENTS

| 5,991,299 | A | * | 11/1999 | Radogna et al. | ............. | 370/392 |
| 6,400,695 | B1 | * | 6/2002 | Chuah et al. | .................. | 370/310 |
| 2001/0043576 | A1 | * | 11/2001 | Terry | ........................... | 370/328 |
| 2002/0012328 | A1 | * | 1/2002 | Emanuel et al. | ............... | 370/328 |
| 2003/0223417 | A1 | * | 12/2003 | Higashida | ...................... | 370/389 |
| 2004/0157595 | A1 | * | 8/2004 | Kruger | ........................... | 455/423 |
| 2004/0205752 | A1 | * | 10/2004 | Chou et al. | ...................... | 718/100 |
| 2007/0097926 | A1 | * | 5/2007 | Liu et al. | ........................ | 370/335 |

FOREIGN PATENT DOCUMENTS

| EP | 0713310 | 5/1996 |
| WO | WO 03025767 | 3/2003 |
| WO | WO 03047280 | 6/2003 |

\* cited by examiner

*Primary Examiner* — Charles N Appiah
*Assistant Examiner* — Jaime M Holliday
(74) *Attorney, Agent, or Firm* — Francis I. Gray; Matthew D. Rabdau; Michael J. Fogarty, III (57) ABSTRACT

A method for determining a transmission parameter at an interface between nodes of a transmission system for a specific channel, where there exist a plurality of channels between the nodes serving either for communication between the nodes or for communication with a subscriber, first determines whether the transmission parameter relates to a protocol for communication between nodes or a protocol for communication with the subscriber. If the protocol is for communication between nodes, then the particular protocol is determined by analyzing octets of data and awarding points to one or the other of such protocols, the protocol with the most points corresponding to the transmission parameter. If the protocol is for communication with the subscriber, then the particular protocol corresponding to the transmission parameter is determined by analyzing length of header information data, direction of data flow and number of bits in a specified location.

22 Claims, 4 Drawing Sheets

DETERMINING A TRANSMISSION PARAMETER IN A TRANSMISSION SYSTEM

BACKGROUND OF THE INVENTION

The present invention relates to protocol analysis, and more particularly to determining a transmission parameter in a transmission system at an interface between nodes of the transmission system.

According to the Global System for Mobile (GSM) communications digital cellular radio standard, which is used in many developed countries around the world, a subscriber occupies a radio frequency of the cellular network which is only assigned to the subscriber. The frequency is occupied by the subscriber for as long as the subscriber maintains connection to the network, regardless of whether there are speech pauses and regardless of the services purchased by the subscriber which are offered by the associated providers. Since radio frequencies are a scarce resource which cannot be copied any number of times, this state is considered worthy of improvement. After this system of the second generation (2G) of mobile communication, there followed as a 2.5G system the General Packet Radio Service (GPRS) standard. As a representative of the third generation (3G) the Universal Mobile Telecommunications Standard (UMTS) network then followed. Via this network a multiple number of subscribers may be served compared with the GSM network, the channels available being distributed more efficiently when there is less speech activity so less capacity is used. Moreover, the capacity may be varied as a function of the purchased services. With the UMTS network diverse information is transmitted on the channels, i.e., information addressed between nodes of the transmission system, information addressed to a plurality of subscribers, and information addressed to only one particular subscriber. The information breaks down into useful information and management information. For monitoring instruments or protocol testers or the like to which only a particular interface in a cellular network of this kind is accessible, there now is the problem that they have to find out from a connection already established how individual channels are occupied in order to enable decoding and hence further processing of the data transmitted.

Further information on the terms used below in connection with the UMTS network may be obtained from documentation available via the domain www.3GPP.org. Document 3GPP TS 25.301 provides an overview of channel usage in a UMTS network. Documents 3GPP TS 25.427 and 3GPP TS 25.435 deal with frame protocol (FP), document 3GPP TS 25.321 deals with Medium Access Control (MAC) protocol, document 3GPP TS 25.322 with Radio Link Control (RLC) protocol, document 3GPP TS 25.331 with Radio Resource Control (RRC) protocol and document 3GPP TS 25.433 with Node B Application Part (NBAP) protocol. Further information on Access Link Control Application Part (ALCAP) protocol may be obtained from ITU Recommendation ITU 0.2630.2. With regard to Service Specific Connection Oriented Protocol (SSCOP), reference is made to ITU Recommendation ITU Q.2110.2.

Figure 1:
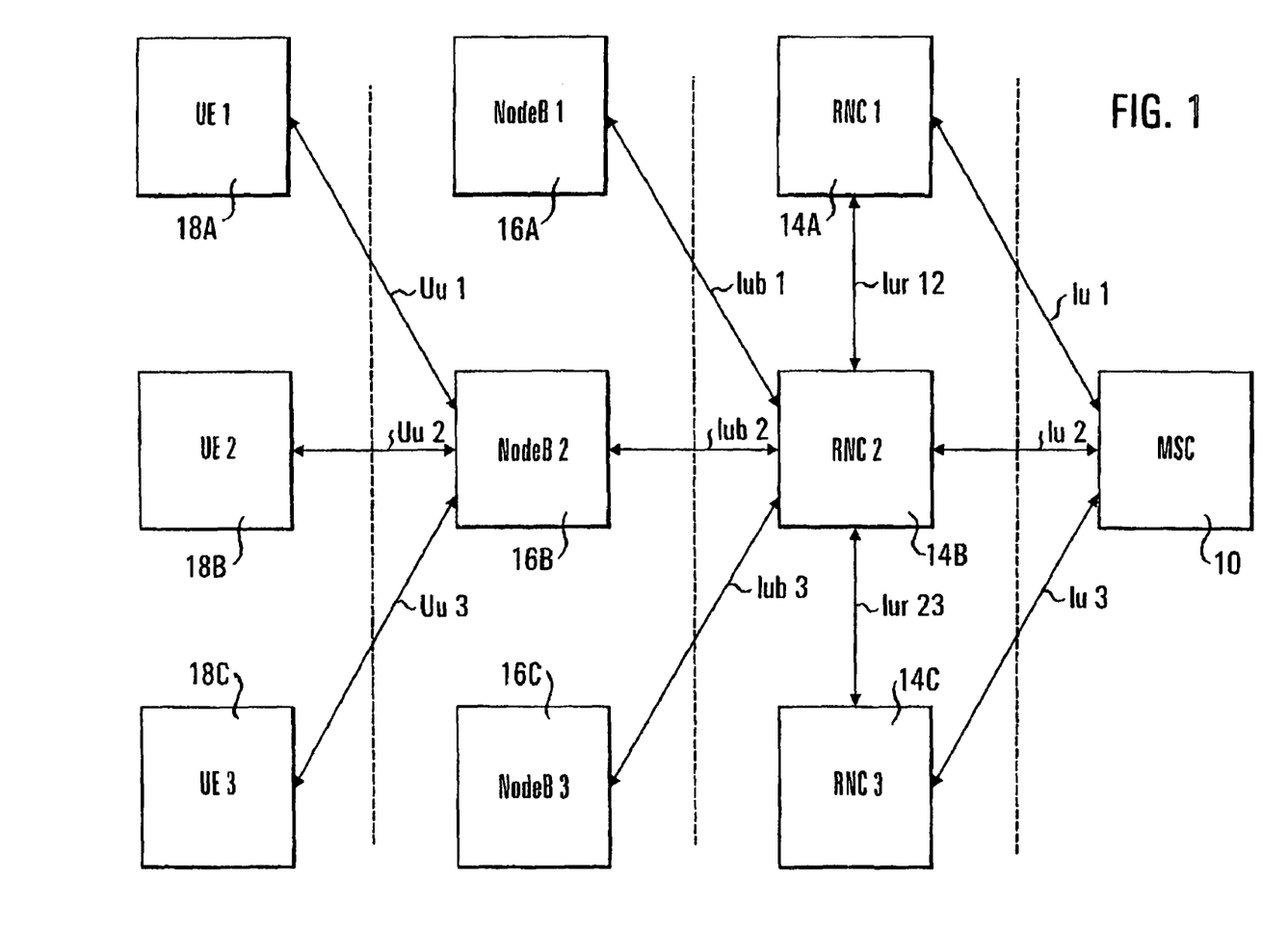
FIG. 1 is a schematic representation of the nodes and interfaces of a UMTS cellular network.

For a better understanding of the problem addressed by the present invention, FIG. 1 shows a part of a UMTS network with a Mobile Switching Center (MSC) 10, three Radio Network Controllers (RNCS) 14A, 14B, 14C, three Nodes B 16A, 16B, 16C, and three user equipments (UEs) 18A, 18B, 18C. Between the MSC 10 and each RNC 14 there is arranged one Iu interface each, between the RNC 14B and each Node B 16A, 16B, 16C there is arranged one Iub interface each, between the RNCs 14A, 14B, 14C there is arranged one Iur interface each and between user equipments 18A to 18C and Node B 16B there is arranged one Uu interface each.

The functions of Node B 16 may be summarized as follows. Node B 16 forms a logical node, such as the Base Transceiver System (BTS) in a GSM network; it is responsible for the transmitting and receiving in one or a plurality of radio cells to/from user equipment; it terminates the Iub interface, i.e., the NBAP and the ALCAP; it is used for radio frequency (RF) power control; and it controls a predeterminable number of radio cells. Node B 16 thus is a base station to which a plurality of transmitter and receiver antennas are connected, with each such antenna combination defining a radio cell.

The RNC 14 controls the use and the integrity of the radio resources. The RNC 14 terminates RANAP (Radio Access Network Application Protocol), NBAP, ALCAP (Access Link Control Application Part), RNSAP (Radio Network Subsystem Application Part) and RRC/RLC/MAC protocols, and it forms the central element of a UMTS network. The RNC 14 thus is a radio switching station to which a plurality of radio base stations are connected.

The functions of the protocol used at the Iub interface may be described as follows: management of the Iub transport resources; logical operation and maintenance of Node B 16, particularly Iub link management; radio cell configuration management; radio network performance measurements; resource event management; management of the CTCH (Common Transport Channel); radio resource management; and radio network configuration alignment. It further includes the implementation of a specific operation and maintenance transport, and the function of system information management. In addition, the following functions are realized at the Iub interface: traffic management for common channels, i.e., for channels which apply to all subscribers connected to the relevant Node B 16, particularly access control means; power management; and data transfer. Moreover, it takes over the functions of traffic management for dedicated channels, i.e., channels allocated to a particular subscriber, notably radio link management, radio link supervision, channel allocation/deallocation, power management, measurement report, and dedicated transport channel management as well as data transfer.

Figure 2:
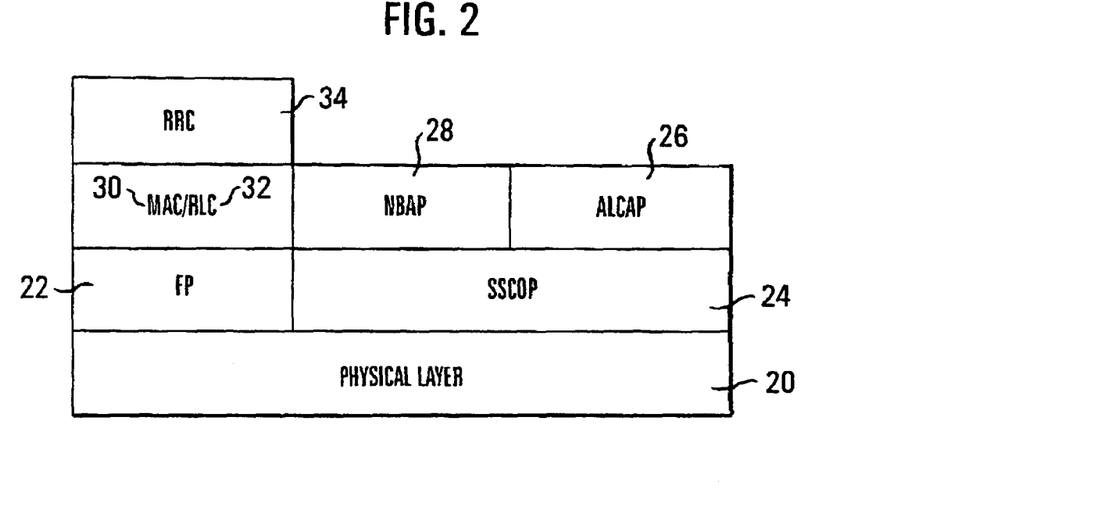
FIG. 2 is a schematic representation of the protocols and layers involved in an Iub interface.

FIG. 2 shows the protocols and layers involved at the Iub interface. The bottom-most protocol layer is the physical layer 20 on which there are based frame protocols 22 and other SSCOP 24 protocols of a data link layer. Layer 24 is followed by the ALCAP 26 and the NBAP 28 which serve the base station management. The NBAP link serves in particular the configuration of the radio cells and it opens the channels for the radio cells. The ALCAP link defines the usage of the channels opened by the NBAP. While ALCAP 26 is specific to an ATM (Asynchronous Transfer Mode) transport layer, there is no ALCAP for an Internet Protocol (IP) transport layer. In the following, however, an ATM transport layer is assumed so that it is possible to describe the differentiation between NBAP and ALCAP. The present invention may also be applied to an IP transport layer, the differentiation between NBAP and ALCAP then not being applicable.

ALCAP 26 and NBAP 28 serve the communication between the RNC 14 and Node B 16—information addressed between nodes. The individual frame protocols 22 are the channel types FACH (Forward Access Channel), RACH (Random Access Channel) and PCH (Paging Channel) which are passed on to all subscribers of a Node B 16—information addressed to all subscribers, and DCH (Dedicated Channel) which is transmitted specifically to a particular subscriber—information addressed to only one subscriber. In order to be able to represent a plurality of logical command levels on a frame protocol, logical channels MAC 30 and RLC 32 are based on the aforementioned frame protocols. RRC 34 is based on the MAC/RLC protocols 30, 32.

Figure 3:
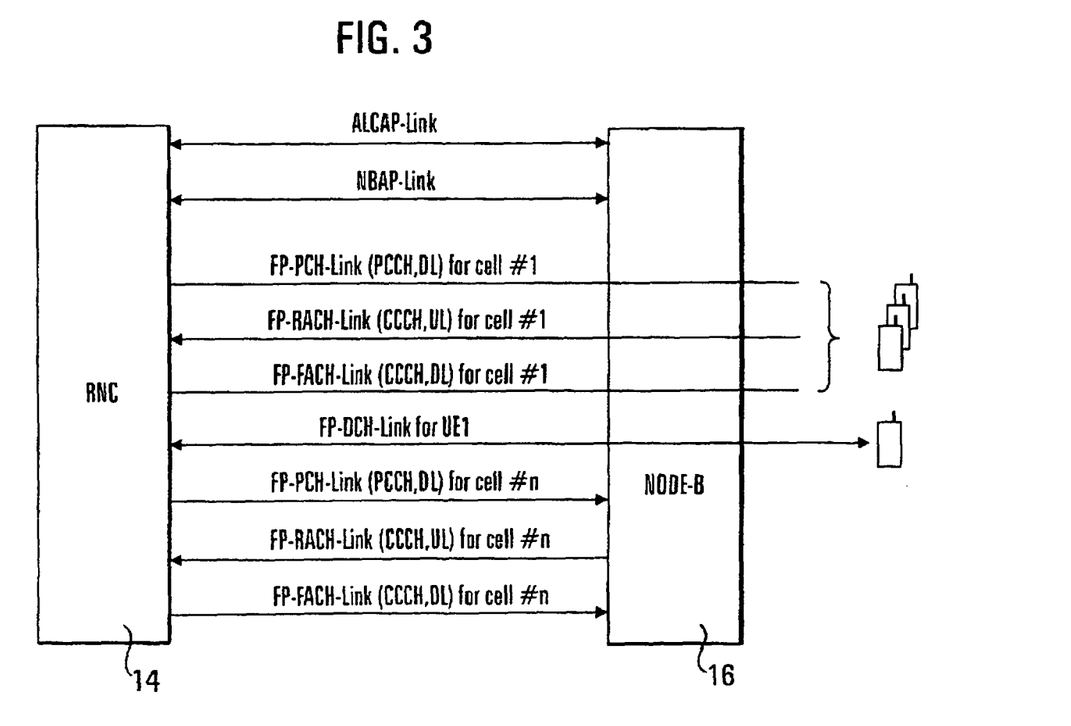
FIG. 3 is a schematic representation of the different types of communication channels occurring at an Iub interface.

FIG. 3 shows a detailed schematic representation of the links used between an RNC 14 and a Node B 16. First an ALCAP link and an NBAP link, which serve the communication between RNC 14 and Node B 16, then an FP PCH link for radio cell No. 1, i.e., all the subscribers assigned to radio cell 1, an FP RACH link for radio cell No. 1, an FP FACH link for radio cell No. 1, and finally an FP DCH link for the user equipment No. 1. Further FP links for radio cell No. n have been added as examples. As is seen from FIG. 3, the links ALCAP and NBAP end in the respective nodes, while the links PCH, RACH and FACH are passed on the Node B side to the plurality of subscribers and link DCH passes on the Node B side to a specific subscriber. In a GSM network the information transmitted in the six aforementioned channels is transmitted in a single channel, and thus the problem of differentiating between the individual channels, as in the present case of the UMTS network, does not occur at all.

To be able to execute, for example, a protocol monitoring task on an Iub interface, it is necessary to know the occupancy of the individual channels. For further evaluations, the configuration for the links NBAP, ALCAP 28, 26 and of the common and dedicated control channels is required for each Node B 16 connected to the RNC 14 and each radio cell. Unfortunately, the control channels are dynamically opened with varying parameters or protocols. An exchange of the configuration parameters of the frame protocols 22 and of the MAC 30 and the RLC 32 for these channels is transmitted via the links NBAP 28 and ALCAP 26 only during the initialization phase of each Node B 16. In an active UMTS network it is, however, not possible to re-initialize the Nodes B 16 in order to determine the channel configuration for monitoring purposes each time a monitoring instrument or a test instrument is switched on.

A proprietary method was tried where the physical layer was evaluated in terms of the length of the used data packets. This method was based on the fact that the length of the data packets may be configured by the user. The type of data was defined through user-specified lengths. The corresponding lengths were determined and stored in a database in a user-related way, i.e., particularly sorted by providers and operators of the respective networks. Now, if the Iub interface of a particular operator is to be monitored, the corresponding data entry is queried and the corresponding parameters loaded. However, this method does not provide a satisfactory solution for monitoring tasks in which the corresponding parameters employed by the user are not known or are changed in the meantime.

What is desired is to further develop the proprietary method in such a way that the performance of protocol monitoring tasks is made easier.

BRIEF SUMMARY OF THE INVENTION

Accordingly the present invention provides a method of determining a transmission parameter, such as a communication protocol, between nodes in a transmission system using an auto-configuration process for a protocol monitor in which individual parameters or communication protocols are determined automatically on the basis of previously known differentiation parameters or by way of a trial-and-error method. In this way the relevant transmission parameters or protocols are determined even without knowledge of user-specified lengths of data packets. The steps for determining the transmission parameters are particularly oriented towards the network standards so that user-specific solutions do not have to be taken into consideration.

The objects, advantages and other novel features of the present invention are apparent from the following detailed description when read in conjunction with the appended claims and attached drawing.

DETAILED DESCRIPTION OF THE INVENTION

While the proprietary method only evaluated the physical layer 20 (FIG. 2), the method described below evaluates higher protocol layers which are free of user-specific peculiarities, such as agreements for data packet lengths. Only in a supplementary manner, for example to accelerate the method according to the present invention, are user-specific parameters evaluated and used. Generally, however, knowledge thereof is not required.

In a preferred embodiment the following steps are performed: (1) a data stream received at an interface is decoded according to communication protocols that are being considered as a transmission parameter for the communication between nodes of a transmission system or for the communication with at least one subscriber; (2) decoding is stopped as soon as meaningful data arise with the communication protocol presently used, or all communication protocols being considered have not resulted in any meaningful decoded data; and (3) the decoding result is evaluated to make a decision. The decision is either (1) the present channel serves for communication between the nodes of the transmission system if decoding results in meaningful decoded data when a communication protocol was used for the communication between the nodes of the transmission system or if decoding has resulted in no meaningful decoded data and the communication protocols used were for communication with at least one subscriber; or (2) it is decided that the present channel serves the communication with at least one subscriber if decoding results in meaningful decoded data and a communication protocol was used for the communication with at least one subscriber or if decoding has resulted in no meaningful decoded data and the communication protocols used were for the communication between the nodes of the transmission system. This is a rough decision taken with respect to an Iub interface of the UMTS network as to whether the present channel is a channel of the NBAP/ALCAP group or of the group of frame protocols.

If the first of the aforementioned decisions is taken and if several types of communication channels between the nodes of the system are being considered, as is the case with UMTS networks, then the following steps are performed: (1) decoding of at least a first data quantity of the data stream received under the assumption that it is a communication channel of a first type; and then (2) evaluating the result of the decoding to make another decision. If decoding results in meaningful decoded data, increase a dial position by 1 in favor of the decision that it is a communication channel of the first type; or if decoding results in no meaningful decoded data, increase another dial position by 1 in favor of the decision that the present channel is not a communication channel of the first type. This approach takes account of the fact that there may be data patterns that make sense both for an NBAP link and for an ALCAP link. For this reason bit patterns at different locations in a frame are evaluated, and a majority decision is taken. The two last-mentioned steps of decoding and evaluating are preferably repeated under the assumption that the communication channel is of at least a second or a further type. This way the types collect points and in this manner influence the decision to be finally taken. The steps of decoding and evaluating are preferably repeated for at least a second or a further data quantity. The further data quantity preferably is a data quantity in the same frame. However, it is also possible in the case of other standards for corresponding data quantities to be evaluated in another frame. This means in particular that bit patterns arranged at a corresponding location within a frame are evaluated.

When the evaluation step described last has been performed at least once, a decision is taken as to which type the communication channel is—the type that has the highest dial position—or if the highest dial position is occupied by at least two types of communication channels, it is decided on the basis of a previously concluded agreement which type the communication is.

As already mentioned, for a transmission system of the UMTS type the interface may be an Iub or an Iur interface, the first node an RNC 14 and the second node a Node B 16 or another RNC. A communication channel for the communication between two nodes is either NBAP or ALCAP as the different types.

If the decision is taken that the present channel serves the communication with at least one subscriber and if several types of communication channels for the communication with at least one subscriber of the system are being considered, as is the case with a UMTS network, then the following steps are performed for one protocol layer or for a plurality of protocol layers in a serial sequence from the lowest to the highest protocol layer involved. First, for a predetermined data quantity, such as a frame which has a header control data field within a header field and a useful data field, a first header length is assumed. The associated header control data field is calculated and compared with the actual header control data field. If the calculated header control data field agrees with the actual header control data field, then the channel is allocated to a specific type or a specific group of types of communication channels as a function of the header length determined. If there is no agreement between the calculated header control data field and the actual header control data field, the previous step of assuming a particular header length is repeated with different assumed header lengths until there is agreement between the calculated header control data field and the actual header control data field.

After taking the decision that the present channel serves the communication with at least one subscriber, the following steps are preferably performed. First it is verified whether the specific channel is a channel to the node or a channel to the subscriber, and in a next step, the specific channel is allocated to a group of types as per the result of the verification step.

In addition or as an alternative, the following further steps may be performed after deciding that the present channel serves the communication with at least one subscriber. For a predetermined data quantity, such as a frame which has a field for a running number of a data length for the frame within a header field and a useful data field, determine the length of the field for the running number and then allocate the specific channel to a group of types as per the result of the preceding determination step. The term group may also have only one group member.

The result determined in each case is examined in a higher-level protocol layer and, in the case that the respective result determined cannot be verified, the respective determination step and any subsequent determination steps and the examination step are repeated until it is possible to verify the respective results.

The specific communication channel for the communication with at least one subscriber is of a particular transport channel type, particularly of the FACH, RACH, PCH or DCH type, and of a particular logical channel type, particularly of the BCCH (Broadcast Control Channel), CCCH (Common Control Channel) or PCCH (Paging Control Channel) type.

The method described above may be implemented in monitoring instruments or protocol testers, with the components realized on the software and the hardware sides being arranged at one location and the transfer of the transmission parameters being performed at another location. The protocol tester may be designed to automatically set the transmission parameters for the configuration of the device, so that the requirements concerning a user's qualifications are kept low. This makes it possible for users to operate the protocol tester after a short briefing. In imitation of the aforementioned proprietary method, the protocol tester may also have a memory or be coupled to a memory in which parameter sets are stored for specific users of the transmission systems, and from where they may be loaded by the user as parameters for current use. In this connection it is envisaged that the user may access the parameter sets for the respective assumption steps. This way the determination of the actual transmission parameters is shortened in time considerably.

As already mentioned the present invention is described on the basis of an Iub interface in a UMTS cellular network. Without limitation the method may also be performed at other interfaces of a UMTS network or of another communication network. In a first step, a rough categorization is performed, i.e., it is determined whether the channel is a channel of a frame protocol 22 or not. In case that there is no frame protocol 22, the channel is either a NBAP 28 or an ALCAP 26. So it is determined whether a specific channel is a channel for communicating between nodes of the transmission system or a channel for communicating with at least one subscriber. To this end, the data stream received at the Iub interface is decoded according to the communication protocol that is being considered for the communication between RNC 14 and Node B 16 or for the communication with at least one UE 18. Decoding is stopped as soon as meaningful data result with the communication protocol presently used, or all communication protocols being considered have not resulted in any meaningful decoded data. If decoding has resulted in meaningful decoded data and if a communication protocol was used for the communication between the nodes of the transmission system, or if decoding has resulted in no meaningful decoded data and all communication protocols were used for the communication with at least one subscriber, then the present channel serves the communication between nodes of the transmission system. If decoding has resulted in meaningful decoded data and if a communication protocol was used for the communication with at least one subscriber, or if decoding has resulted in no meaningful decoded data and if all communication protocols were used for the communication between the nodes of the transmission system, then the present channel serves the communication with at least one subscriber. In the first case, the channel is therefore a channel of the NBAP type or of the ALCAP type, while in the second case the channel represents a frame protocol.

In case the channel is a NBAP 28 or ALCAP 26, the procedure continues as follows:

1) First, an attempt is made to decode the frame, which is to be analyzed, according to ALCAP or NBAP rules. If decoding errors occur, the protocol may be the other protocol. However, at least NBAP is a complex protocol that carries ASN.1 (Abstract Syntax Notation One) data which are encoded using packet encoding rules. Complete decoding is inefficient and time-consuming. This needs to be taken into account in particular for UMTS monitoring technology, for which processing speed is a critical parameter. Therefore only a few octets of the frame to be analyzed are evaluated, and then a preliminary decision is taken as to whether it is an ALCAP or an NBAP application. Preliminary decision means that for each data packet selected, points are awarded either to ALCAP or to NBAP. This step is necessary because there are octets which lead to meaningful results for both decoding according to ALCAP rules and decoding according to NBAP rules.

The procedure to be performed to differentiate between ALCAP and NBAP takes place as follows. If the first octet equals an NBAP message type, for example Initiating Message, Outcome, Successful Outcome or Unsuccessful Outcome, then NBAP receives a first point. If the second octet equals a valid NBAP process code, i.e., id-RadioLinkSetup, then NBAP receives another point. If the fifth octet is a valid ALCAP message type, then ALCAP receives one point. If the seventh octet exists, i.e., the frame length is equal to or longer than seven, and if the octet is a valid ALCAP parameter type, then ALCAP receives another point. ALCAP receives the point even if there are no message parameters, i.e., the frame only contains six octets. Finally, NBAP receives another point if bit 7 or bit 3 in the seventh octet equals "1" because in valid ALCAP frames these bits always have to equal "0" (so-called spare bits).

At the end of the algorithm which of the two candidates has collected the most points is checked, and such candidate is then declared the winner. If both candidates have scored the same number of points, ALCAP is declared the winner. Surprisingly, practical tests have shown that the results are no better, i.e., no more accurate, if further frames of the same communication channel are subjected to this algorithm.

If it is found in the first analysis that the channel is a frame protocol channel, then the procedure is as follows. Among the frame protocol channels there are three downlink data channel types, i.e., data channels that are directed towards the subscriber, namely FACH, PCH and DSCH (Downlink Shared Channel), and there are three uplink data channel types, i.e., data channels that are directed towards the node, namely RACH, CPCH (Common Packet Channel) and USCH (Uplink Shared Channel), and this in addition to DCH, which is either a downlink, an uplink or a bi-directional link.

Each of these types has a differently structured header and payload, in addition to a large number of transport formats, transport format compilations and logical link combinations.

Unfortunately, from the content of the data stream it is not possible to differentiate the channel types or to determine the configuration that is required for decoding the data frames. This is different for control frames that may be identified by the frame type and the control frame type fields.

Figure 4:
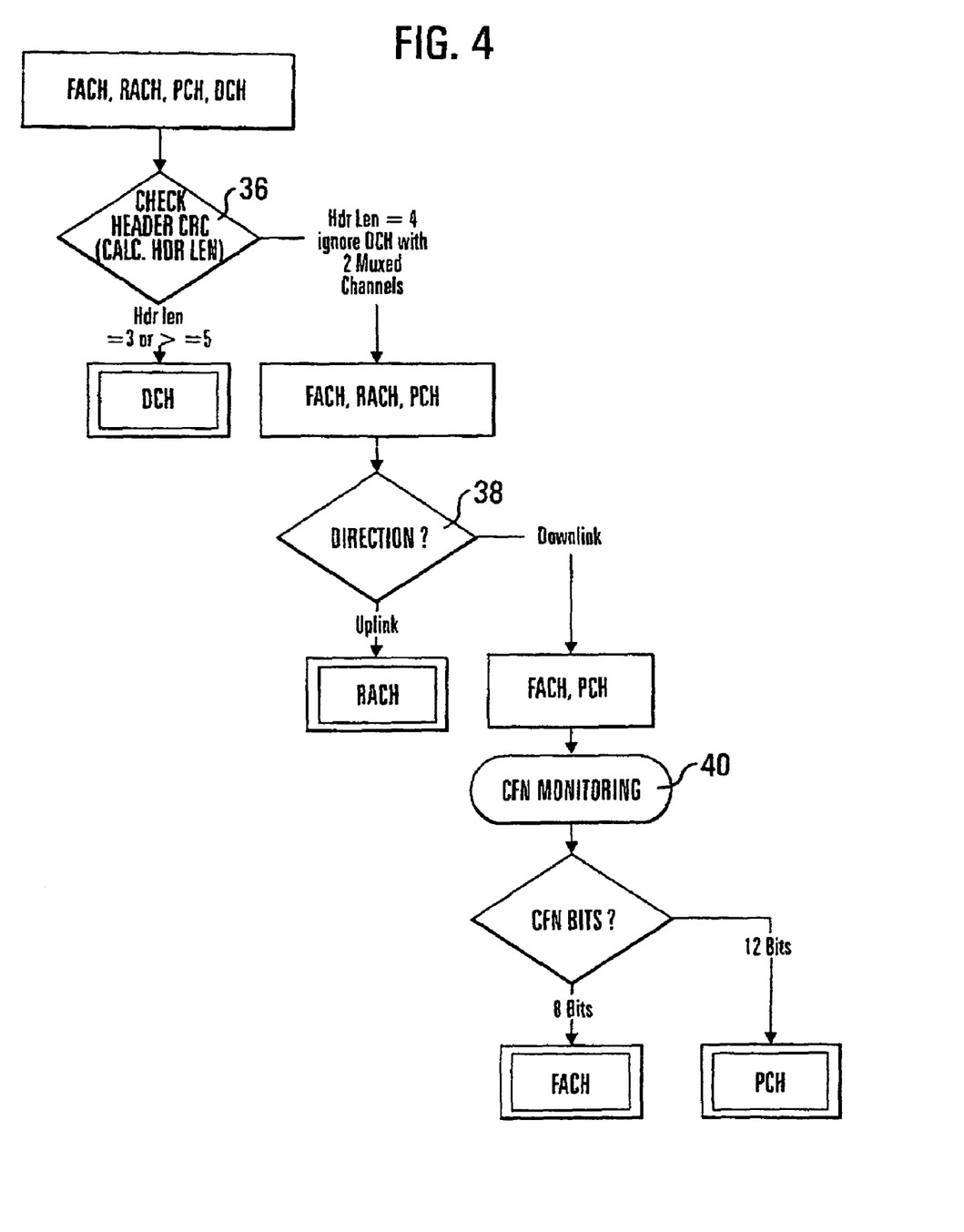
FIG. 4 is a block diagram representation of the procedure for determining whether a transmission parameter for a specific communication channel between transmission nodes is of the FACH, RACH, PCH or DCH type according to the present invention.

In the following there is described as an example the differentiation of the data frame types FACH, PCH, RACH and DCH, as they are the ones most commonly used at an Iub interface for the joint control level. With reference to FIG. 4, it is possible to determine the length of the header, and this through the use of the header CRC (Cyclic Redundancy Code)—the algorithm assumes a certain length, calculates the associated CRC and compares it with the actual CRC of the present frame. If the CRCs are different, then this step is repeated with another value for the header length. As soon as the length is known, some frame types are differentiated and the first byte of the payload is specified. The algorithm shown in FIG. 4 may be used to differentiate between the channel types RACH, FACH and PCH, which are used for signalling, and to determine the channel type of the data stream. It is based on the following assumptions:

no CPCH, DSCH and USCH types occur, i.e., only FACH, RACH, PCH and DCH types;

no CRC errors occur;

DCHs do not have to be evaluated for further processing and are therefore ignored;

the uplink and the downlink directions are known.

Figure 7:
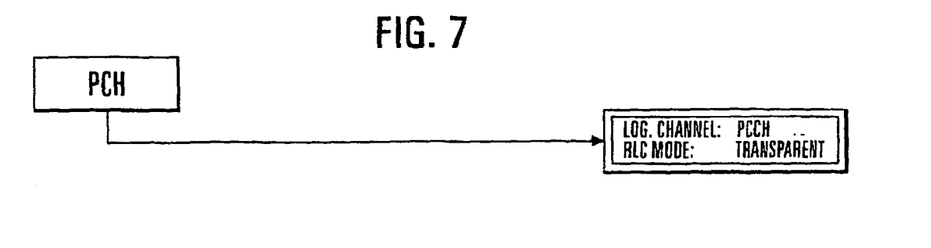
FIG. 7 is a block diagram representation of a further differentiation where the communication channel is of the PCH type according to the present invention.

If condition 36, see FIG. 4, is not fulfilled, i.e., CPCH and/or DSCH frames exist, then for DSCH frames the algorithm continues to function because DSCH frames have a header size greater than 5 and are separated in a way similar to the DCH type. Thus, after separation of the DCH types there are channel types with a header length of 4, namely FACH, RACH and PCH. Under condition 38 it is determined whether this is an uplink or a downlink. If it is an uplink, the present channel is of the RACH type. If it is a downlink, the present channel is of the FACH or the PCH type. Box 40 is used to evaluate the running number (CFN—Connection Frame Number), especially the bit length of the running number. If this exhibits 8 bits, the channel is of the FACH type; if it exhibits 12 bits, the channel is of the PCH type. As shown in FIG. 7 the PCH channel is logged as PCCH with the RLC mode as "transparent."

In the case of CPCH frames it is not possible to differentiate between CPCH and RACH frames using the algorithm shown in FIG. 4 because both have exactly the same structure. Yet in this case the knowledge about the logical channels from higher layers, for example MAC 30 or RLC 32, may be used to filter out the required CPCH frames. In a similar way as with the header length, the payload CRC may be used to determine the length of the payload frame.

The determination of the transport formats, the transport format compilations or the combinations and modes of the logical channels is much more difficult. The 3GPP specification describes a few predetermined configurations, and every manufacturer applies certain settings to configure its system. These parameters may be stored in a database. Most of the data are network-dependent. Preferably, the database is designed such that it stores not only the manufacturer-dependent settings, but also the network-dependent settings. Such databases may be used to determine the settings required for a correct decoding in accordance with the "trial and error" method. Another way of determining the transport formats employs the System Information Blocks (SIBs) of the NBAP system, which may be monitored in the NBAP protocol. Both methods, i.e., use of a database and use of the SIB information, may also be used together to reduce the number of possibilities.

Thereafter which logical channels are reproduced on the transport channels is determined in accordance with the above method. To this end the following preconditions are assumed:

the above algorithm applied to the frame protocol channel types finds at least one of the following transport channel types: FACH, RACH, PCH;

only the common logical control channel types CCCH, SHCCH, BCCH and PCCH are reproduced;

there is only FDD (Frequency Division Duplex), i.e., a reproduction on SHCCH is ignored.

Five parameters are needed to describe the reproduction of a transport channel on a logical channel:

the logical channel type;

the RLC mode (Transparent, Acknowledge, Unacknowledge);

the value of the C/T (Channel for Transport) field, if a transport channel is reproduced on more than one logical channel (MUX—multiplexed);

the length of the RLC length indicator field (7 or 15 bits) the RLC user (PDCP—Packet Data Convergence Protocol—or RRC).

Of the first three parameters listed, the logical channel type and the RLC mode are determined from the transport channel type and the first bits (length: 1 to 8 bits) of the MAC Packet Data Unit (PDU) (TCTF=Target Channel Type Field) which describe the logical channel type.

Figure 5:
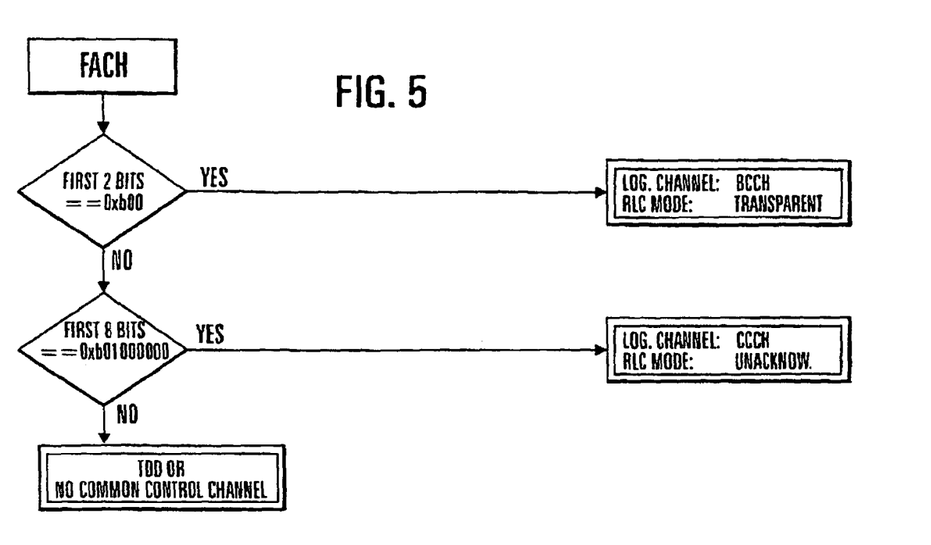
FIG. 5 is a block diagram representation of a further differentiation where the communication channel is of the FACH type according to the present invention.

FIG. 5 illustrates the procedure if the transport channel is of the FACH type. If the first two bits equal "0xb00", the logical channel is of the BCCH type and the RLC mode is "Transparent." If the first eight bits equal "0xb01000000", the logical channel is of the CCCH type and the RLC mode is "Unacknowledged". If neither of the two possibilities applies, it is a TDD (Time Division Duplex) or not a CCC (Common Control Channel) type.

Figure 6:
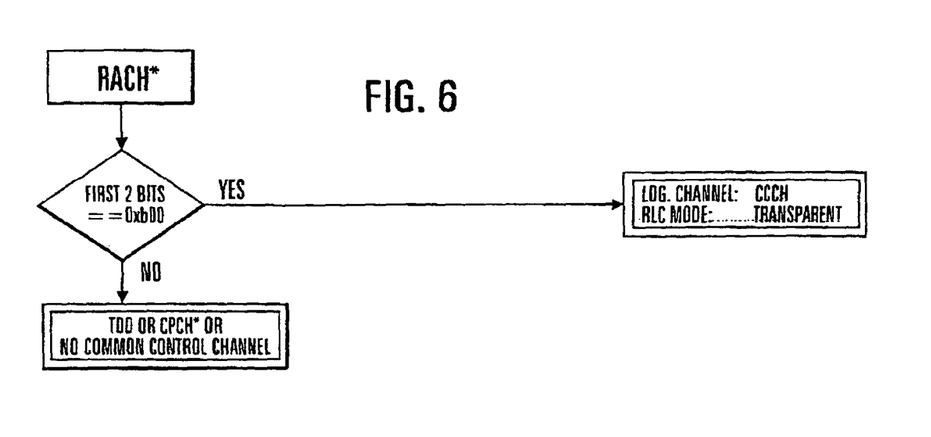
FIG. 6 is a block diagram representation of a further differentiation where the communication channel is of the RACH type according to the present invention.

FIG. 6 illustrates the procedure if the transport channel is possibly of the RACH type. If the first two bits equal "0xb00, the logical channel is of the CCCH type and the RLC mode is "Transparent." Otherwise it is a TDD or CPCH or not a CCC type.

Thus the present invention provides a method of determining a transmission parameter, such as a communication protocol, for a particular channel between multi-channel nodes of a transmission system by roughly determining which group of parameters applies to the particular channel, and then differentiating which parameter within the determined group is the transmission parameter based on differentiating factors.

What is claimed is:

1. A method of determining a transmission parameter for a channel at a multi-channel interface, the channels serving either for communicating between nodes of a transmission system according to one of a first set of transmission parameters or for communicating with a subscriber according to one of a second set of transmission parameters, comprising the steps of:

decoding a received data stream at the multi-channel interface between the nodes of the transmission system by applying each transmission parameter of a selected one of the first and second sets of transmission parameters in turn until meaningful data result or all of the transmission parameters of the selected set have been applied;

first deciding from the results of the decoding step whether the channel is for communicating between nodes or for communicating with a subscriber;

wherein the channel is determined to serve for communication between the nodes of the transmission system if the decoding results in meaningful data when decoded using a communication protocol for communication between the nodes of the transmission system or if decoding has resulted in no meaningful data when decoded using communication protocols for communication with at least one subscriber, and the channel is determined to serve for communication with at least one subscriber if the decoding results in meaningful data when decoded using a communication protocol for communication with at least one subscriber or if decoding has resulted in no meaningful data when decoded using communication protocols for the communication between the nodes of the transmission system; and if the channel is determined to serve for communication between the nodes of the transmission system, then decoding a first data quantity of the data stream under the assumption that it is from a communication channel of a first type; and increasing a first counter if the decoding of the first data quantity results in meaningful decoded data, the first counter indicating a likelihood that the channel is associated with the first type, and increasing a second counter if the decoding of the first data quantity results in no meaningful decoded data, the second counter indicating a likelihood that the channel is not associated with the first type.

2. The method as recited in claim 1 further comprising the step of second deciding the transmission parameter for the channel from the set of transmission parameters determined from the first deciding step.

3. The method as recited in claim 2 wherein the multi-channel interface comprises an Iub interface and the transmission system comprises a UMTS communication system.

4. The method as recited in any of claims 1-3 wherein the first set of transmission parameters comprises a group of communication protocols for communicating between the nodes in the transmission system.

5. The method as recited in claim 4 wherein the group of communications protocols for communicating between nodes comprises NBAP and ALCAP.

6. The method as recited in claim 5 wherein, when the channel is for communicating between nodes, the second deciding step comprises the steps of:

decoding a data quantity of the received data stream according to one of the communication protocols from the first set of transmission parameters; and evaluating a result from the data quantity decoding step to determine the transmission parameter for the channel.

7. The method as recited in claim 6 wherein the second deciding step further comprises the step of repeating the decoding step for different data quantities of the received data stream according to the one communication protocol.

8. The method as recited in claim 7 wherein the evaluating step comprises the steps of:

for each data quantity determining whether meaningful data result from the decoding step; and determining that the one communication protocol is the transmission parameter when a majority of the data quantities produce meaningful data results from the decoding step.

9. The method as recited in claim 8 further comprising the step of repeating the steps of claims 9-11 for another one of the communication protocols from the first set of transmission parameters as the one communication protocol when there is no majority from the determining step.

10. The method as recited in claim 8 further comprising the step of assigning another of the communication protocols from the first set of transmission parameters as the transmission parameter for the channel when there is no majority from the determining step.

11. The method as recited in claim 4 wherein the second set of transmission parameters comprises a group of communication protocols for communicating with a subscriber.

12. The method as recited in claim 11 wherein the group of communication protocols for communicating with the subscriber comprises frame protocols.

13. The method as recited in claim 12 wherein the frame protocols comprise PCH, RACH, FACH and DCH.

14. The method as recited in claim 13 wherein, when the channel is for communicating with a subscriber, the second deciding step comprises the steps of:
  determining a header length for a frame of the received data; and
  assigning to the channel a specific group of transmission parameters from the second set of transmission parameters as a function of the header length.

15. The method as recited in claim 14 wherein the determining step comprises the steps of:
  assigning a predetermined header length for the frame;
  calculating a CRC for the predetermined header length for the frame from the received data;
  if the CRC from the calculating step does not agree with a corresponding value in the frame, repeating the assigning and calculating steps for a different predetermined header length, otherwise the predetermined header length is the header length for the frame.

16. The method as recited in claim 14 further comprising the step of determining a direction of communication for the channel if the header length for the frame is a specific length.

17. The method as recited in claim 16 further comprising the steps of:
  assigning a specified one of the communication protocols from the second set of transmission parameters as the transmission parameter if the direction is an uplink direction;
  monitoring a bit length for a running number in the frame if the direction is a downlink direction; and
  selecting another one of the communication protocols from the second set of transmission parameters as the transmission parameter based on the bit length.

18. A method for determining a communication protocol used on a channel, comprising:
  decoding a data stream from the channel, the data stream decoded using multiple communication protocols selected from one or more communication protocols used for communication between nodes of a transmission system and one or more communication protocols used for communication with at least one subscriber;
  stopping the decoding when meaningful data is decoded using a presently selected communication protocol;
  evaluating a decoding result to determine whether the channel serves for communication between nodes of the transmission system or the channel serves for communication with at least one subscriber, wherein
    the channel is determined to serve for communication between the nodes of the transmission system if the decoding results in meaningful decoded data when a communication protocol was used for the communication between the nodes of the transmission system or if decoding has resulted in no meaningful decoded data and the communication protocols used were for communication with at least one subscriber, and
    the channel is determined to serve for communication with at least one subscriber if the decoding results in meaningful decoded data when a communication protocol was used for the communication with at least one subscriber or if decoding has resulted in no meaningful decoded data and the communication protocols used were for the communication between the nodes of the transmission system; and
  if the channel is determined to serve for communication between the nodes of the transmission system, then decoding a first data quantity of the data stream under the assumption that it is from a communication channel of a first type; and
  increasing a first counter if the decoding of the first data quantity results in meaningful decoded data, the first counter indicating a likelihood that the channel is associated with the first type, and
  increasing a second counter if the decoding of the first data quantity results in no meaningful decoded data, the second counter indicating a likelihood that the channel is not associated with the first type.

19. The method of claim 18, further comprising:
  decoding the first data quantity of the data stream under the assumption that it is from a communication channel of a second type;
  increasing a third counter if the decoding of the first data quantity results in meaningful decoded data, the third counter indicating a likelihood that the channel is associated with the second type, and
  increasing a fourth counter if the decoding of the first data quantity results in no meaningful decoded data, the fourth counter indicating a likelihood that the channel is not associated with the second type.

20. The method of claim 19, further comprising:
  decoding a second data quantity of the data stream under the assumption that it is from a communication channel of the first type;
  increasing the first counter if the decoding of the second data quantity results in meaningful decoded data, and
  increasing the second counter if the decoding of the second data quantity results in no meaningful decoded data.

21. The method of claim 20, wherein the first data quantity and the second data quantity are selected from a same frame.

22. The method of claim 20, wherein the first data quantity and the second data quantity are selected from corresponding locations in different frames.

* * * * *